UNITED STATES PATENT OFFICE.

ROBERT WAHL, OF CHICAGO, ILLINOIS.

SOUR LIQUID.

1,028,508.  Specification of Letters Patent.  Patented June 4, 1912.

No Drawing.  Application filed September 5, 1911. Serial No. 647,668.

*To all whom it may concern:*

Be it known that I, ROBERT WAHL, a citizen of the United States, residing at Chicago, in the county of Cook and State of Illinois, have invented a new and useful Improvement in Sour Liquid, of which the following is a specification.

The object of my invention is to provide, by a novel process of manufacture a new article of sour liquid, which is useful for all the purposes for which the known or commercial article known as vinegar may be used—for examples, as a condiment or a preservative or pickling medium; but which shall be particularly wholesome and devoid of all the objectionable and deleterious qualities of ordinary vinegar or acetous fermentation.

To this end my invention consists in a sour liquid, which may be properly termed, by analogy, lactegar, it being composed of the products of lactic acid fermentation to the exclusion of the products of substantially all other fermentation, and in which the lactic acid content exceeds one-half of one per cent. by weight; and it also consists in the process which I have devised for manufacturing my improved article.

To practise my process it is necessary to provide the proper culture media for the growth of the lactic acid bacteria in the form of an aqueous mixture of the necessary food for promoting that growth and to maintain certain temperatures at which lactic acid forming bacteria will thrive to the exclusion of substantially all other fermentations. Lactic acid fermentation takes place by the splitting up of saccharine matter, like lactose, dextrose, maltose, levulose and other sugars, into lactic acid, one molecule of sugar yielding two or a multiple of two molecules, or about the same weight, of lactic acid. This fermentation proceeds with the natural growth of the ferment, lactic acid bacteria, which multiply rapidly in the liquor at temperatures within the range of about 45° C. to 55° C. In reproducing themselves these bacteria form new protoplasm out of the available supply of food, and this protoplasm, which is built up of nitrogenous matter and mineral substances, must be contained in the culture medium.

The materials that may be used for my purpose include the following: All whole grains, or by-products thereof, such as bran, middlings, shorts, the gluten particularly of corn, brewers' and distillers' grains, malt sprouts, flour and meal; seeds and by-products thereof, as flaxseed, linseed, hemp and cotton seed, and the cake forming the residue of oil extraction therefrom; sugar beets, sugar cane, grapes and olives, and the residuum of each after subjecting it to extraction; yeast and its extract; meat and its extract; and amino and peptid bodies, whether natural or artificial. In many of these materials the nitrogenous food for the growth of the lactic acid bacteria is contained in a readily available form, for instance in meat and yeast extract, amino and peptid bodies; whereas in others, like whole grains and by-products thereof, the nitrogenous matter is not readily available, being insoluble in water, but it is made readily soluble, or its solubility is materially increased, by the lactic acid, some of these nitrogenous constituents being broken down readily through the agency of the lactic acid at a temperature of 45° C.–55° C., for instance nitrogenous bodies contained in whole grains, wheat bran, middlings, etc., peptones and amino bodies being formed to furnish fit nitrogenous food material for growing the bacteria. Many of these materials also contain the necessary mineral constituents for carrying on the lactic acid fermentation, some in a readily available form, like meat extract and yeast extract, while in others these mineral bodies are not readily soluble in water, but become so by the aid of lactic acid. Where the mineral matter is wanting or deficient, as in brewers' grains, the same may be supplied by adding phosphates, potassium salts, etc. Thus these materials, by mixing them with water, supplying the necessary saccharine matter by adding sugar, inoculating the mixture with lactic acid bacteria and maintaining the proper temperature for the requisite length of time, become food media for the propagation of lactic acid fermentation and the formation of the resultant lactic acid.

While I contemplate the inoculation by lactic acid bacteria as an essential step with most of these materials, it is not necessary with some, like malt and malt sprouts, to actually add these bacteria from an extraneous source, since they naturally contain a large number of lactic acid bacteria. As is well known, infection by lactic acid may also proceed naturally, that is, without addition as, for instance, through contact with air, this taking the place of artificial inoculation.

To explain my improved process in detail, it may be described with the use of wheat-bran, as the material to be treated, as follows: I mash or mix the bran with water, using, by weight, about 20 to 50 parts of bran with about 15 to 25 parts of sugar to about 1000 parts of water. This mash is heated to 55° C., or thereabout, and is then inoculated with lactic acid bacteria; preferably by adding a portion of an acidulated mash of a previous procedure according to my process. After inoculation, the mash is held at a temperature of between 55° C. to 45° C., or thereabout, until the extent of acidulation approximates at least one per cent., which is sufficient for the use of the liquor as a condiment, as for salad dressings, though for preserving or pickling purposes the percentage of acidulation should be at least 3 per cent. I find that by maintaining this mash at the prescribed temperature for a period of from 24 to 48 hours, the extent of acidulation will reach 1 per cent. and over; and when the process is practised with malt as the material, the extent of acidulation in that period reaches to 2–2½ per cent. The acidulated liquor, containing the products of lactic acid fermentation to the exclusion of practically all other fermentation, is then separated from the solid matter of the mash, and may then be filtered, or first concentrated and then filtered. By concentration the extent of acidulation is increased, and the increase should be to at least 3 per cent. to give strength to the liquor and lend to it the keeping quality necessary to render it commercial.

For treating any of the other named materials for my purpose, the process is the same as that described of the treatment of wheat-bran, except that where the starch of the grain employed itself yields the requisite amount of sugar by conversion in the mashing step, no sugar need be added.

What I claim as new and desire to secure by Letters Patent is—

1. The process of manufacturing the herein described sour liquid, which consists in mixing with water, food-material having the property of promoting the growth of lactic acid bacteria, inoculating the mixture with lactic acid bacteria and maintaining it, until the extent of the acidulation approximates at least one per cent., at a temperature that will promote the fermenting action of said bacteria and prevent substantially all other fermentation in said mixture, while retaining the unassimilated food-remnants and other unfermented and unfermentable extractive substances of said material.

2. The process of manufacturing the herein described sour liquid, which consists in mixing with water, food-material having the property of promoting the growth of lactic acid bacteria, raising the temperature of the mixture to 55° C., or thereabout, thereupon inoculating the mixture with lactic acid bacteria and maintaining it, until the extent of acidulation approximates at least one per cent., at a temperature that will promote the fermenting action of said bacteria and prevent substantially all other fermentation in said mixture, while retaining the unassimilated food-remnants and other unfermented and unfermentable extractive substances of said material.

3. The process of manufacturing the herein described sour liquid, which consists in mixing with water, food-material having the property of promoting the growth of lactic acid bacteria, inoculating the mixture with lactic acid bacteria and maintaining it, until the extent of acidulation approximates at least one per cent., at a temperature that will promote the fermenting action of said bacteria and prevent substantially all other fermentation in said mixture, while retaining the unassimilated food-remnants and other unfermented and unfermentable extractive substances of said material and condensing the resultant liquor to increase the acid content thereof to an extent that will preserve it.

4. The herein described sour liquid composed of the products of lactic acid fermentation to the exclusion of the products of substantially all other fermentation and in which the lactic acid content approximates at least one per cent., and the unassimilated food-remnants and other unfermented and unfermentable extractive substances of lactic-acid-bacteria-growing food-material.

5. The herein described sour liquid consisting of a concentrated liquor composed of the products of lactic acid fermentation to the exclusion of the products of substantially all other fermentation and in which the proportion of lactic acid is sufficiently in excess of one per cent. to preserve said liquor against spoiling, and the unassimilated food-remnants and other unfermented and unfermentable extractive substances of lactic-acid-bacteria-growing food-material.

ROBERT WAHL.

In presence of—
GUSTAVE L. GOOB,
JOHN NALIKOWSKY.